July 7, 1959 W. D. CLARK 2,894,120

SELECTIVE CIRCUIT

Filed Dec. 16, 1955 3 Sheets-Sheet 1

INVENTOR:
WELMON D. CLARK,

BY Julius J. Zaskalicky
HIS ATTORNEY.

INVENTOR:
WELMON D. CLARK,
BY Julius J. Zaskalicky
HIS ATTORNEY.

INVENTOR:
WELMON D. CLARK,
BY Julius J. Zaskalicky
HIS ATTORNEY.

United States Patent Office 2,894,120

Patented July 7, 1959

2,894,120

SELECTIVE CIRCUIT

Welmon D. Clark, Fulton, N.Y., assignor to General Electric Company, a corporation of New York Application December 16, 1955, Serial No. 553,491

9 Claims. (Cl. 250—6)

The present invention relates to selective circuits and has as a particular object thereof to provide an improved selective amplifier arrangement responsive only to signals within a certain limited range of frequencies and amplitudes.

Another object of the present invention is to provide improved means for developing an output in response to waves lying within a predetermined range of amplitudes.

A still other object of the present invention is to provide a circuit which becomes more effective in its nonresponsiveness to adjacent channel signals and undesired frequencies as these signals increase in amplitude.

A further object of the present invention is to provide a selective response means which is selective with regard to frequency and/or amplitude and which has maximum immunity to false operation and adjacent channel interference.

A still further object of the present invention is to provide a simple yet highly effective single-tone selective response apparatus which is substantially independent of supply potentials and the amplitude ratio of desired signal to noise.

Applicant's circuit has particular application in communications systems of a kind where means are employed to select a particular receiver with which communication is to be had to the exclusion of other receivers in the system.

Accordingly, another object of my invention is to provide improved means for selectively activating a receiver with which communication is to be had from a transmitting station.

In carrying out the present invention in one form to be described, there is provided a selective transmission system comprising a selective amplifier including a rejection network and another amplifier. A signal is applied to the input of the selective amplifier and two output voltages are derived therefrom. One output voltage has a peaked response about the rejection network frequency, and the second voltage has a negative peak response about said frequency. The first of said output voltages from said selective amplifiers varies linearly with the input thereto for signals up to a predetermined amplitude and thereafter developing an output which increases with input at a decreasing rate. The other of said output voltages is applied to the other of said amplifiers which develops an output varying linearly with input to said transmitter means for signals up to and beyond said predetermined amplitude. The amplitude of output of said selective amplifiers is arranged to be greater than the amplitude of the output of said second amplifier over the linear range of said selective amplifier. Thus, the difference in output of the two amplifiers increases over the linear range of the selective amplifier and for a region therebeyond and thereafter descreases. Means are provided for differentially combining said outputs. Further means are provided responsive to said differential output when said output exceeds a predetermined minimum value. Such an arrangement in combination with a selective rejection network enables a response to be had only when the amplitude of the input lies within a predetermined range of amplitudes and the frequency of input lies within a predetermined range of frequency. Such a combination renders the operation of the selective transmission system free from false operation, such as adjacent channel signals and spurious noise reception.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
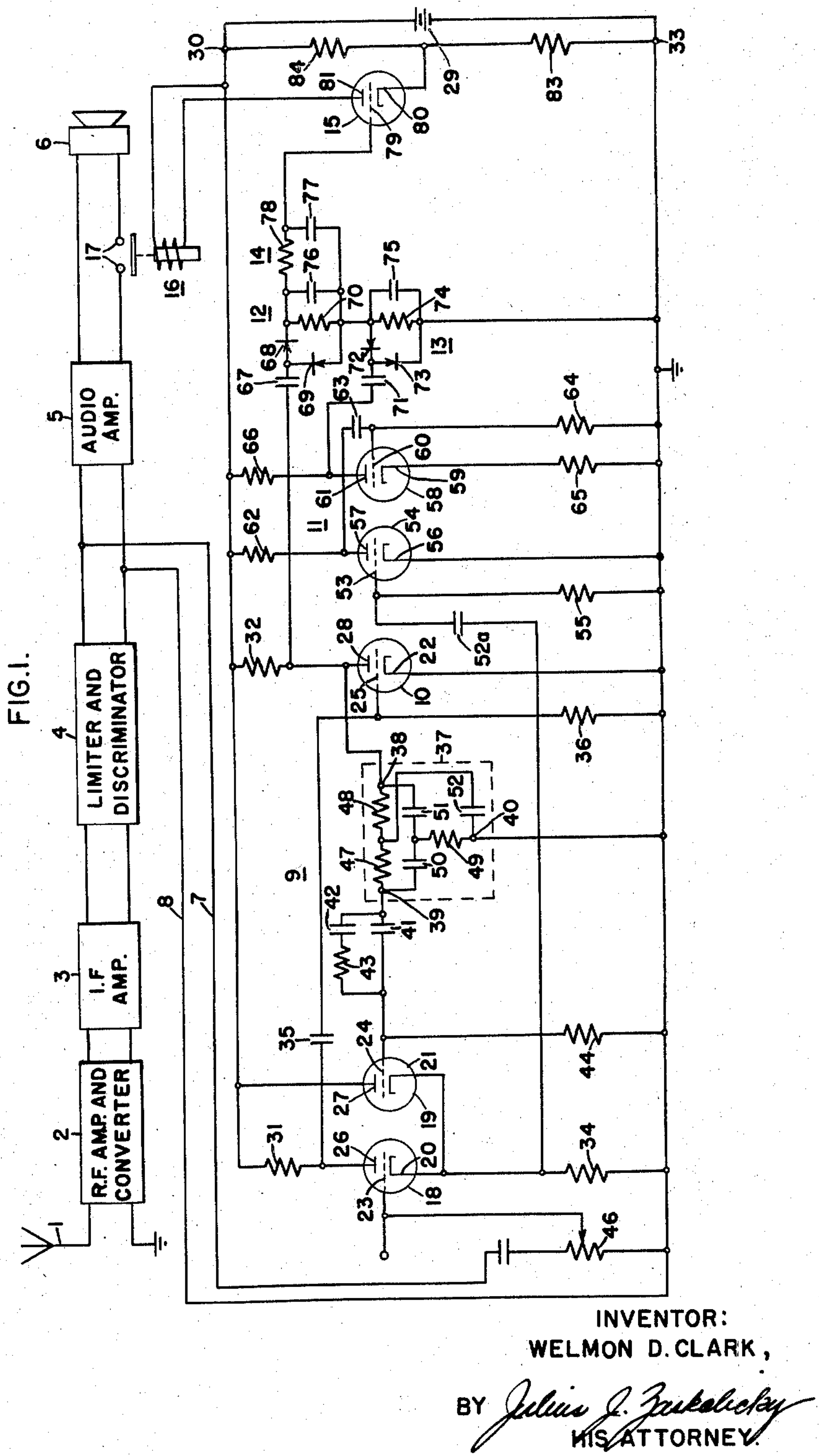
Figure 1 shows an illustrative embodiment of the present invention partially in schematic form as applied for use in connection with a frequency-modulation receiver.

The receiver comprises an antenna 1, a radio-frequency amplifier and converter 2, an intermediate-frequency amplifier 3, a limiter and discriminator 4, an audio amplifier 5, and a loudspeaker 6 connected together in that order. Signals obtained at the output of the discriminator 4 are applied over conductors 7 and 8 to the input of the selective amplifier 9 which is tuned to pass waves of a particular frequency and reject other waves.

Selective amplifier 9 includes an amplifier portion 10 which amplifies waves applied to the input thereof linearly up to a predetermined amplitude, thereafter the output from the amplifier increases at a decreasing rate. Associated with this selective amplifier 9 is a differential amplifier 11 which amplifies waves applied to the input thereof linearly up to the aforementioned amplitude and therebeyond. The level of the output of the differential amplifier 11 is arranged to be less than the output of the amplifier 10 up to said predetermined amplitude. Accordingly, it is seen that the difference in output from the two amplifiers increases linearly until said predetermined amplitude is reached, thereafter the output increases at a decreasing rate, eventually reaching a peak and thereafter decreasing.

The output from selective amplifier 10 is rectified by the voltage-doubler circuit 12 and the output from the differential amplifier 11 is rectified by the voltage-doubler circuit 13. Rectifiers in the voltage-doubler circuits 12 and 13 are reversely polarized so that when the outputs from these circuits are additively combined, the resultant output represents the rectified A.C. difference in the output of the two amplifiers. Accordingly, it is seen that the difference varies as mentioned above.

The output from the voltage doublers 12 and 13 is applied to an integrating network 14, the output of which is applied to the switching device 15 which, in turn, operates the relay 16 having a set of contacts 17 serially interposed between the audio amplifier 5 and the speaker 6. The device 15 is biased to be rendered conductive in response to a voltage greater than a predetermined minimum value. This value is exceeded only when the applied signal is greater than a predetermined value and less than another predetermined value and occurs for a sufficiently long interval as determined by the time constant of the integration network 14. When these conditions are met, device 15 is rendered conductive; and consequently relay 16 is energized, thereby coupling the audio amplifier 5 to the speaker 6 or, in other words, rendering the audio channel of the frequency modulated receiver operative. To obtain this operation, it is also necessary that the signal being received be of the proper frequency. When the frequency is removed from the proper frequency, larger amplitudes of input signal are required to obtain sufficient output as will be explained below.

Selective amplifier 9 comprises amplifier 18, impedance transformer amplifier 19 and amplifier 10 each of which includes an electron discharge device with respective cathodes 20, 21 and 22, respective grids 23, 24 and 25, and respective anodes 26, 27 and 28. These devices are supplied with unidirectional operation potential from source 29, having a positive terminal 30 connected to the anode 27 directly and to the anodes 26 and 28 through resistances 31 and 32, respectively, and having a negative terminal 33 connected to cathodes 20 and 21 through resistance 34 and directly to cathode 22.

Electron discharge devices 18 and 19 function as an amplifier and impedance transformer, respectively. Waves appearing across the resistance 31 are applied to the electron discharge device 10 through a coupling capacitor 35 connected between the anode 26 and grid 25. Grid leak resistance 36 is connected between grid 25 and ground. The output from amplifier 10 is applied in degenerative phase to amplifier 18, through filter network 37 and impedance transformer amplifier 19. Filter network 37 has an input terminal 38 and an output terminal 39 and a common terminal 40. The anode 28 of the electron discharge device of amplifier 10 is connected to input terminal 38. Common terminal 40 is connected to ground. The output terminal 39 is connected through capacitor 41, shunted by series combination of capacitor 42 and resistance 43, to grid 24 of the electron discharge device of impedance transformer amplifier 19. Grid 24 is connected through grid leak resistance 44 to ground. Grid 23 is connected to ground through grid leak resistance 46.

Network 37 comprises resistances 47, 48 and 49 and capacitances 50, 51 and 52. Resistances 47 and 48 are connected in series between input and output terminals 38 and 39, respectively, and capacitor 52 is connected between the junction of these resistances and the common terminal 40. Capacitors 50 and 51 are connected in series between the input terminal and output terminals 38 and 39, respectively, and the junction of these capacitances is connected to ground through resistance 49. When the resistances and capacitances of the network are proportioned so that resistance 47 equals resistance 48, capacitance 50 equals capacitance 51, capacitance 52 equals twice capacitance 50, and resistance 49 equals one-half of resistance 47, the transmission characteristic of the network is such that at the center frequency, determined by the relationship.

$$\text{Center frequency}=\frac{1}{2\pi\times\text{resistance } 47\times\text{capacitance } 50}$$

voltage waves applied between the input terminals 38 and 40 are not transmitted to the output terminals 39 and 40. However, at frequencies on either side of the center frequency, the transmission of waves between said terminals increases with increase in departure from the center frequency. Thus, the feedback through the network 37 from amplifier 10 to amplifiers 18 and 19 is zero at the center frequency of the network and is degenerative at frequencies both above and below the center frequency. Accordingly, the amplifiers devices 18 and 10 amplify the center frequency considerably more than frequencies on either side of the center frequency and thus amplifier 9 selectively passes signals having the frequency to which the network is tuned.

The network comprising capacitors 41 and 42 and resistance 43 is known as an anti-thumping network and functions to prevent self-oscillation of the amplifier at frequencies below the frequency of operation of the selective amplifier and particularly frequencies of the order of a few, as for example, 3 cycles per second. The capacitance 35 and resistance 36 at the input of amplifier 10 are arranged so that the amplifier 10 saturates, or produces an output which increases at a decreasing rate with input, at a particular amplitude of input signal.

The output across resistance 34 is coupled through coupling capacitor 52*a* to the grid 53 of device 54 of differential amplifier 11. The differential amplifier 11 comprises electron discharge device 54 including cathode 56, grid 53 and anode 57, and device 58 including cathode 59, grid 60 and anode 61. Cathode 56 is connected to ground. Resistance 55, connected between grid 53 and ground, is arranged such that the output from the differential amplifier 11 is linear up to and beyond the aforementioned particular amplitude of input signal. Anode 57 is connected through anode load resistance 62 to the positive terminal 30 of source 29. The output from the amplifier 54 is capacitively coupled through capacitance 63 to the grid 60 which is also connected to ground through grid resistance 64. The cathode 59 is connected through cathode resistance 65 to ground. The anode 61 is connected through anode load resistance 66 to the positive terminal 30.

The anode 28 of the electron discharge device of amplifier 10 is capacitively coupled through capacitance 67 to the junction of a pair of rectifiers 68 and 69 connected in series across a load resistance 70 with the anode of one rectifier connected to the cathode of the other rectifier. The output of the anode 61 is capacitively coupled through capacitance 71 to the junction of rectifiers 72 and 73, connected in series across load resistance 74. The anode of one rectifier is connected to the cathode of the other. The circuit comprising capacitance 67, rectifiers 68 and 69, resistance 70 and capacitance 76 functions as a voltage-doubler circuit. The rectifiers 68 and 69 are poled such that the output appearing across resistance 70 is positive at the upper end of resistance 70. Similarly, the arrangement comprising capacitance 71 and rectifiers 72 and 73, resistance 74, and capacitor 75 comprises a voltage-doubler circuit, the rectifiers 72 and 73 being poled such that the upper end of resistance 74 is negative with respect to the lower terminal. Resistances 70 and 74 are connected in series such that an output is obtained between the upper end of resistance 70 and ground which is the sum of the rectified outputs from amplifiers 10 and 11.

The output from amplifier 10 at the network frequency is arranged to be greater than the output from amplifier 11 up to a predetermined amplitude of output, thereafter the amplitude of the output from amplifier 10 increases at a decreasing rate until a maximum value is reached. Thus the difference in the output from amplifiers 10 and 11 increases linearly up to that predetermined value of output, thereafter increases at a decreasing rate, reaches a maximum, and thereafter decreases.

The unidirectional output appearing at the upper end of resistance 70 to ground is applied to the integrating network 14 comprising capacitance 77 in series with resistance 78 in shunt across the capacitance 76. The upper end of capacitance 77 is connected to grid 79 of the electron discharge device of switching device 15 which also includes a cathode 80 and an anode 81. Cathode 80 is connected to ground through resistance 83 and through resistance 84 to the positive terminal 30. The anode 81 is connected through the coil of relay 16 to the positive terminal 30. The biasing voltage on cathode 80 is arranged so that device 15 is normally non-conductive until a voltage of a magnitude greater than a predetermined minimum is applied to the grid 79. This voltage is dependent upon the time constant of the integrating network 14 and the amplitude of the differential output.

Figures 2, 4:
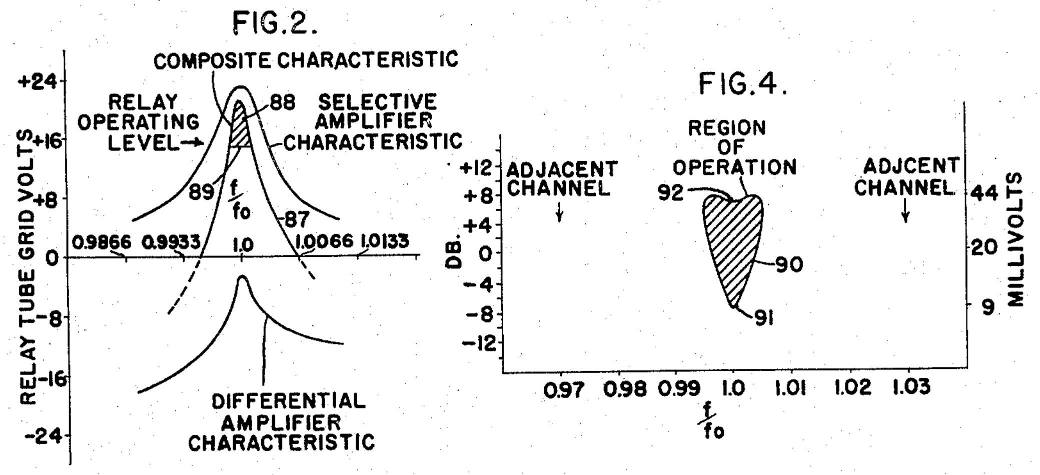
Figure 2 and Figure 3 show graphs useful in explaining the differential amplifier portion of the embodiment of Figure 1.
Figure 4 shows the nature of the variation of response of the selective transmission system with respect to frequency and amplitude of applied signal.

The nature of the response characteristic of the selective and differential amplifiers 9 and 11 will be apparent by reference to Figure 2 which shows graphs of the output of the selective amplifier 9 and the differential amplifier 11 as a function of frequency and amplitude. In this figure is also shown a graph 87 of the composite result of differentially combining the outputs from the selective amplifier and the differential amplifier. The shaded portion 88 indicates that region in which the composite output exceeds a predetermined minimum represented by ordinate 89. When this output is exceeded for a predetermined minimum time interval, sufficient voltage is developed at the output of the integrating network 14 to actuate the device 15.

Figure 3:
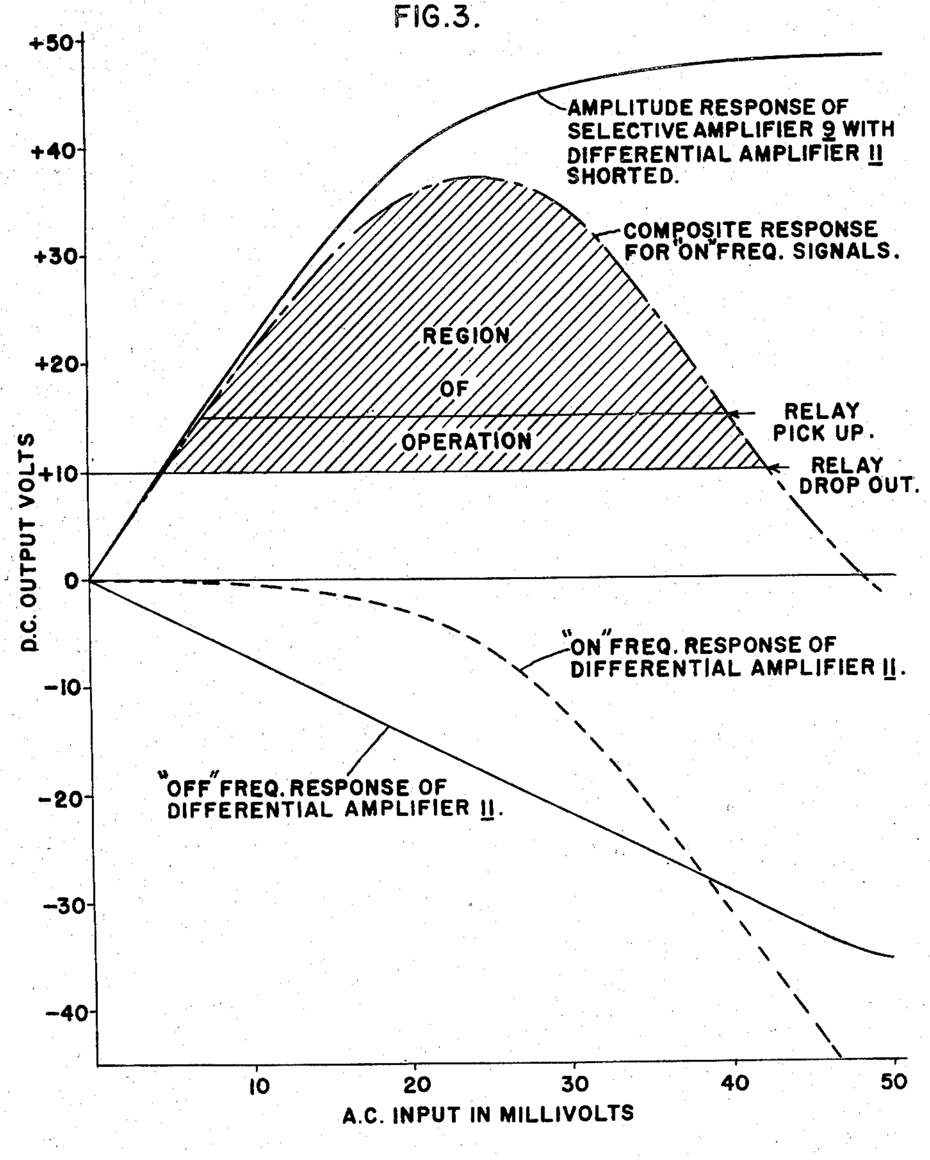

Referring now to Figure 3, the amplitude response of the selective amplifier 9 and differential amplifier 11 are plotted. The ordinate of the graph is D.-C. output volts and the abscissa of the graph or independent variable is the A.-C. input signal in millivolts to the selective amplifier. The graph marked "amplitude response of selective amplifier 9" represents D.-C. voltage from the voltage doubler 12 with the differential output shorted. Likewise, the graph marked "'off' frequency response of differential amplifier 11" represents the D.-C. voltage from the voltage doubler 13. Two graphs are shown for the differential amplifier 11. The graph marked "'off' freq. response of differential amplifier 11" is the normal amplitude response of the differential amplifier 11. The curve marked "'on' freq. response of the differential amplifier 11" is the amplitude response from the differential amplifier at the frequency of the selective network 37. The latter graph decreases at an increasing rate with amplitude of input signal as the distortion products from the output of the amplifier 11 increase with amplitude, and hence more energy is obtained through the network 37 and appears at the input of the differential amplifier as larger amplitudes of input signal. If the latter response curve is added to the selective amplifier characteristic, the curve marked "composite response for 'on' freq. signals" is obtained. The shaded area represents the region in which relay 16 is caused to operate. Note that the output drops off sharply at large amplitude inputs because of the saturation of the selective amplifier and also because of the increased output from the differential amplifier at large amplitude inputs. This characteristic is highly desirable in a selective circuit.

The conditions shown in Figure 3 exist for one signal frequency only. If a third variable, frequency, is introduced, the graph shown in Figure 4 is obtained. This graph illustrates the response characteristic when input signal in millivolts is plotted against the ratio of signal frequency $f$ to center frequency $f_0$ to which the selective network 37 is tuned. The figure thus obtained is similar to a cardoid. It should be noted that for every frequency above and below the selective network frequency and within the limits of the cardoid, there are two limiting values of input signal for which the control device 16 is energized.

Figure 5:
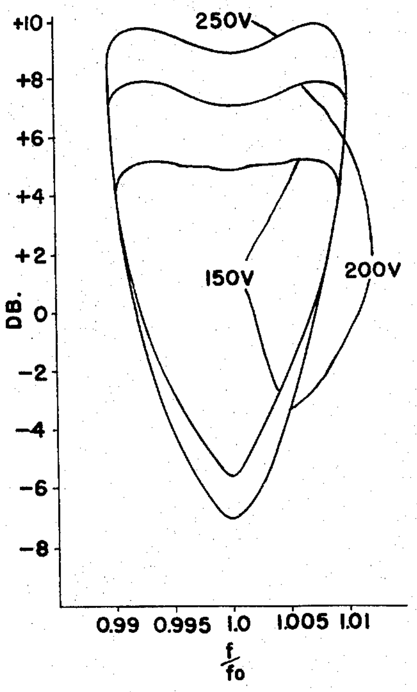
Figure 5 shows a graph of the variation of the response characteristic of the selective transmission system with applied operating potentials.

Figure 5 is a graph similar to the graph of Figure 4 for different values of supply voltage. The variation shown is produced by the change in linearity of the two amplifiers 9 and 11. As the supply voltage is increased, the height of the cardoid increases. Actually, the cardoid grows in both directions vertically upward and downward due to extended linearity and increased sensitivity of the selective amplifier.

Figure 6:
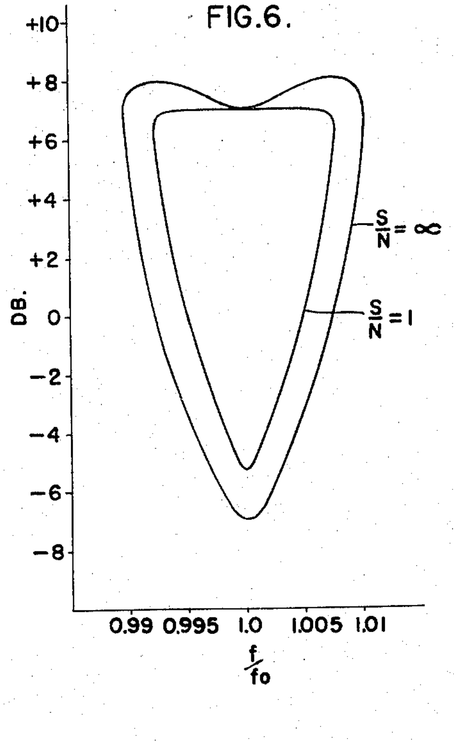
Figure 6 shows the variation of the response characteristic of the selective transmission system with variations in the signal-to-noise ratio at the input of the selective transmission means.

In Figure 6 other graphs of the cardoid of Figure 4 are shown. The graphs shown in Figures 4 and 5 represent conditions when the signal-to-noise ratio is infinity. Figure 6 illustrates what happens to the operating characteristic when the signal-to-noise ratio drops to one. Noise is defined here as F-M noise from a receiver or an audio signal at the adjacent frequency of the selective network frequency.

While I have shown a particular embodiment of my invention, it will, of course, be understood that I do not wish to be limited thereto since many modifications, both in the circuit arrangement and in the instrumentalities employed, may be made and I, therefore, contemplate by the appended claims to cover any such modifications that come within the true spirit and scope of my invention.

What I claim as new and desire to secure by Letters Patent of the United States is:

1. In combination, a selective means including a pair of amplifiers, means associated with one of said amplifiers for producing an output from said one of said amplifiers varying substantially linearly with input to the selective means for signals up to a predetermined amplitude and thereafter producing an output which increases with input at a decreasing rate, means associated with the other of said amplifiers for producing an output from said other of said amplifiers varying substantially linearly with input to said selective means for signals up to and beyond said predetermined amplitude, means for differentially combining said outputs for producing a differential output which increases in one polarity with applied signal and thereafter decreases, and means responsive to said differential output above a predetermined amplitude.

2. In combination, in a selective transmission system comprising a selector filter means, a pair of amplifiers, means for coupling the output of said selector filter means to the input of each of said amplifiers, means associated with one of said amplifiers whereby said one of said amplifiers develops an output varying substantially linearly with input to the transmission means for signals up to a predetermined amplitude and thereafter develops an output which increases with input at a decreasing rate, means associated with the other of said amplifiers whereby said other of said amplifiers develops an output varying substantially linearly with input to said transmission means for signals up to and beyond said predetermined amplitude, whereby the output of said other amplifier for a predetermined input to said transmission means is decreasingly less than the output of said one amplifier, means for differentially combining said outputs whereby said differential output increases in one phase with applied signals and thereafter decreases, and means responsive to said differential output above a predetermined amplitude.

3. In combination, an amplifier having a feedback path from the output to the input thereof in which a network is so connected and arranged as to transmit waves from the output to the input thereof in degenerative phase at all except a narrow band of frequencies whereby said amplifier selectively passes waves in said narrow band of frequencies and rejects waves of other frequencies, means associated with said amplifier whereby said amplifier develops an output varying linearly with input thereto for signals up to a predetermined amplitude and thereafter develops an output which increases with input at a decreasing rate, another amplifier having an input connected to the input of said one amplifier, means associated with said another amplifier whereby said another amplifier develops an output varying linearly with input to said one amplifier for signals up to and beyond said predetermined amplitude, means for differentially combining said output, whereby said differential output increases in one polarity with applied signal and thereafter decreases, and means responsive to said differential output above a predetermined amplitude.

4. In combination, an amplifier having a feedback path from the output to the input thereof in which a network is so connected and arranged as to transmit waves from the output to the input thereof in degenerative phase at all except a narrow band of frequencies whereby said amplifier selectively passes waves in said narrow band of frequencies and rejects waves of other frequencies, means associated with said amplifier whereby said amplifier develops an output varying linearly with input thereto for signals up to a predetermined amplitude and thereafter develops an output which increases with input at a decreasing rate, another amplifier having an input connected to the input of said one amplifier, means associated with said another amplifier whereby said another amplifier develops an output varying linearly with input to said one amplifier for signals up to and beyond said predetermined amplitude, means for individually rectifying the outputs of each of said amplifiers and differentially combining said outputs whereby a unidirectional output is obtained which increases with applied signal and thereafter decreases, and means responsive to said differential output above a predetermined amplitude.

5. In combination, an amplifier, means for feeding back the output thereof to the input thereof in degenerative phase, said means including a selective network which transmits with minimal amplitude waves of a particular frequency to which said network is tuned and which transmits waves with increasing amplitude with increase in departure from said particular frequency, means associated with said amplifier whereby said amplifier develops an output at said particular frequency varying linearly with input thereto for signals up to a predetermined amplitude and thereafter develops an output which increases with input at a decreasing rate, another amplifier having an input connected to the output of said network, means associated with said another amplifier whereby said another amplifier develops an output varying linearly with input to said transmission means with input thereto for signals up to and beyond said predetermined amplitude, said one amplifier developing greater output than said other amplifier over the linear range of said one amplifier and developing less output than said other amplifier beyond said linear range, means for differentially combining said outputs, whereby said differential output increases in one polarity with applied signal and thereafter decreases, and means responsive to said differential output above a predetermined amplitude of output.

6. In combination, an amplifier, means for feeding back the output thereof to the input thereof in degenerative phase, said means including a parallel T network having capacitive and resisitive elements which rejects waves of a particular frequency and transmits waves with increasing effectiveness with increases in departure from said particular frequency, means associated with said amplifier whereby said amplifier develops an output varying substantially linearly with input thereto at said particular frequency for signals up to a predetermined amplitude and thereafter develops an output which increases with input at a decreasing rate, another amplifier having an input connected to the output of said network, means associated with said another amplifier whereby said another amplifier develops an output varying substantially linearly with input thereto for signals at said particular frequency up to and beyond said predetermined amplitude of input to said one amplifier, the output of said other amplifier being less than the output of said one amplifier over the linear range of said one amplifier, means for differentially combining said outputs whereby said differential output increases in one polarity with applied signal and thereafter decreases for a range of signals in the vicinity of said particular frequency, the peak amplitude of said differential output being greatest at said particular frequency and decreasing with increase in departure of the frequency of the signal from said particular frequency, and means responsive to said differential output greater than a predetermined output.

7. In combination, an amplifier, means for feeding back to the output thereof to the input thereof in degenerative phase, said means including a parallel T network having capacitive and resistive elements which rejects waves of a particular frequency and transmits waves with increasing effectivenes with increases in departure from said particular frequency, means associated with said amplifier whereby said amplifier develops an output varying substantially linearly with input thereto at said particular frequency for signals up to a predetermined amplitude and thereafter develops an output which increases with input at a decreasing rate, another amplifier having an input connected to the output of said network, means associated with said another amplifier whereby said another amplifier develops an output varying substantially linearly with input thereto for signals at said particular frequency up to and beyond said predetermined amplitude of input to said one amplifier, the output of said other amplifier being less than the output of said one amplifier over the linear range of said one amplifier, means for rectifying the output of said one amplifier, means for rectifying the output of the other of said amplifiers, said rectified output increasing at an increasing rate with respect to increases in amplitude of input at the frequency of said network, means for differentially combining said outputs whereby a unidirectional output is obtained which increases with applied signal and thereafter decreases for a range of signals in the vicinity of said particular frequency, the peak amplitude of said differential output being greatest at said particular frequency and decreasing with increase in departure of the frequency of the signal from said particular frequency, and means responsive to said differential output greater than a predetermined output.

8. The combination, in a high frequency receiver having a normally inoperative low frequency portion and a normally operative high frequency portion carrying a high frequency wave modulated by a low frequency wave, means for demodulating said modulated high frequency wave, means for applying said demodulated wave to a selective filter means adapted to pass said demodulated wave with greatest effectiveness and adapted to pass waves differing from the frequency of said demodulated wave with lesser effectiveness, a pair of amplifiers, each of said amplifiers connected to the output of said filter means, means associated with one of said amplifiers whereby said one of said amplifiers has an output varying linearly with input to the transmission means for signals up to a predetermined amplitude and thereafter has an output which increases with input at a decreasing rate, means associated with the other of said amplifiers whereby said other of said amplifiers has an output varying linearly with input to said transmission means for signals up to and beyond said predetermined amplitude, the amplitude of the output of the first of said amplifiers in said linear range being greater than the output of said second amplifier for a corresponding same signal and the output of said first amplifier at a signal output beyond said linear portion being substantially the same as the output of said second amplifier, means for differentially combining said outputs whereby said differential output increases with applied signal and thereafter decreases, and means responsive to said differential output above a predetermined amplitude.

9. In combination, a selective means including a pair of amplifiers, means associated with one of said amplifiers whereby said one of said amplifiers develops an output varying linearly with input to the transmission means for signals up to a predetermined amplitude and thereafter develops an output which increases with input at a decreasing rate, means associated with the other of said amplifiers whereby said other of said amplifiers develops an output varying linearly with input to said transmission means for signals up to and beyond said predetermined amplitude, means for individually rectifying said outputs, means for differentially combining said rectified outputs whereby said differential output increases in one polarity with applied signal and thereafter decreases and reverses polarity, and means including an integration network responsive to said differential output when the product of said output by a time factor exceeds a predetermined value.

References Cited in the file of this patent

UNITED STATES PATENTS

| | | |
|---|---|---|
| 2,173,427 | Scott | Sept. 19, 1939 |
| 2,321,651 | Caraway | June 15, 1943 |
| 2,419,615 | Weldon | Apr. 29, 1947 |
| 2,651,673 | Fredendall | Sept. 3, 1953 |
| 2,724,049 | Rouault | Nov. 15, 1955 |
| 2,737,628 | Haines | Mar. 6, 1956 |
| 2,751,555 | Kirkpatrick | June 19, 1956 |
| 2,780,724 | Fickett | Feb. 5, 1957 |
| 2,788,450 | Sunstein et al. | Apr. 9, 1957 |